UNITED STATES PATENT OFFICE.

JOHANNES H. H. O. GÜRKE, OF HÖCHST-ON-THE-MAIN, GERMANY, ASSIGNOR TO FARBWERKE, VORMALS MEISTER, LUCIUS & BRÜNING, OF SAME PLACE.

COLORING-MATTER.

SPECIFICATION forming part of Letters Patent No. 249,926, dated November 22, 1881.

Application filed December 11, 1880. (Specimens.)

*To all whom it may concern:*

Be it known that I, JOHANNES H. H. O. GÜRKE, of Höchst-on-the-Main, Germany, have invented a new and Improved Coloring-Matter, of which the following is a full, clear, and exact description.

My invention has for its object the production of a new red azo coloring-matter from the disulphobetanaphtholic sodium salt insoluble in alcohol by the action of the diazo compound derived from para-amidocinnamic acid methylic ether on the above-named betanaphtholic sodium salt. The diazo compound of the cinnamic-acid ether is obtained in the manner well known to chemists from its amido compound. Also, the process for producing the disulphobetanaphtholic acid is well known to chemists.

To produce the coloring-matter, I, for instance, take nineteen parts of para-amidocinnamic acid methylic ether and dissolve them in two hundred parts of water and twenty parts of muriatic acid of 1.16 specific gravity, and to this solution I add six and nine-tenths parts of nitrite of sodium. The solution of the obtained diazo compound is then poured into a solution of thirty-five parts of disulphobetanaphtholic sodium salt, seventeen parts of ammonia of ten per cent. and forty-five gallons of water. The coloring-matter separates in the form of a red paste, and by dissolving it, precipitating it with common salt, and drying it, I obtain it in the form of a dark-red powder. Dyed on wool or silk it gives a pure bluish-scarlet shade that will stand light and soaping.

This my coloring-matter dissolves in sulphuric acid with a crimson color, and in nitric acid with a yellow-red color. In diluted solutions of alkalies it dissolves with a red color. From the aqueous solution it can be separated by alcohol. It is sparsely soluble in alcohol, forming a reddish solution. Bromine water added to its aqueous solution changes the color from scarlet to yellow.

In the preparation of this compound I do not limit myself to the exact proportions of ingredients, as they may be varied without departing from the principle of my invention.

What I claim as new, and desire to secure by Letters Patent, is—

1. As a new article of manufacture, the dyestuff or coloring-matter having the characteristics herein described.

2. The within-described process for producing a bluish scarlet dyestuff or coloring-matter by the action of the disulphobetanaphtholic sodium salt insoluble in alcohol on the diazoic derivative of para-amidocinnamic acid methylic ether, substantially as set forth.

In testimony whereof I have signed my name to this specification in the presence of two subscribing witnesses.

DR. JOHANNES HEINRICH HERMANN OSKAR GÜRKE.

Witnesses:
   JOSEPH EUGEN REVERDY,
   FRANZ HASSLACHER.